(12) United States Patent
Krajenke et al.

(10) Patent No.: US 8,613,478 B2
(45) Date of Patent: Dec. 24, 2013

(54) CLOSEOUT PANEL FOR VEHICLE DECK LID HINGE

(75) Inventors: Gary W. Krajenke, Warren, MI (US);
Edward L. Schulte, White Lake, MI (US); Alvin N. Standard, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 13/025,016

(22) Filed: Feb. 10, 2011

(65) Prior Publication Data

US 2012/0205937 A1    Aug. 16, 2012

(51) Int. Cl.
*B62D 25/12*    (2006.01)
*E05D 11/00*    (2006.01)

(52) U.S. Cl.
USPC ............ 296/146.11; 296/76; 16/223

(58) Field of Classification Search
USPC ............ 296/146.8, 56, 146.9, 76, 146.11
See application file for complete search history.

(56) References Cited

U.S. PATENT DOCUMENTS

| 3,971,564 | A  | * | 7/1976 | Bowen et al. | 277/507 |
| 7,118,155 | B2 | * | 10/2006 | Miyake et al. | 296/76 |
| 7,758,066 | B2 | * | 7/2010 | Sia et al. | 280/728.2 |

* cited by examiner

*Primary Examiner* — Glenn Dayoan
*Assistant Examiner* — Melissa A Black

(57) ABSTRACT

A vehicle has a deck lid for closing a vehicle luggage compartment. The deck lid is mounted on a hinge assembly including a hinge lever pivoted on a vehicle body and a hinge arm attached to the deck lid. A trim panel lines the luggage compartment and has an oversize aperture creating a gap through which the hinge arm travels freely without interference with the trim panel during the opening and closing movement of the deck lid. A closeout panel is mounted on the hinge assembly to travel therewith. The closeout panel is sized larger than the size of the oversize aperture and upon the deck lid reaching the open position, the closeout panel will have moved with the hinge assembly to a position closely adjacent the backside of the trim panel so that the closeout panel closes the gap and prevents an observer from seeing through the gap.

4 Claims, 2 Drawing Sheets

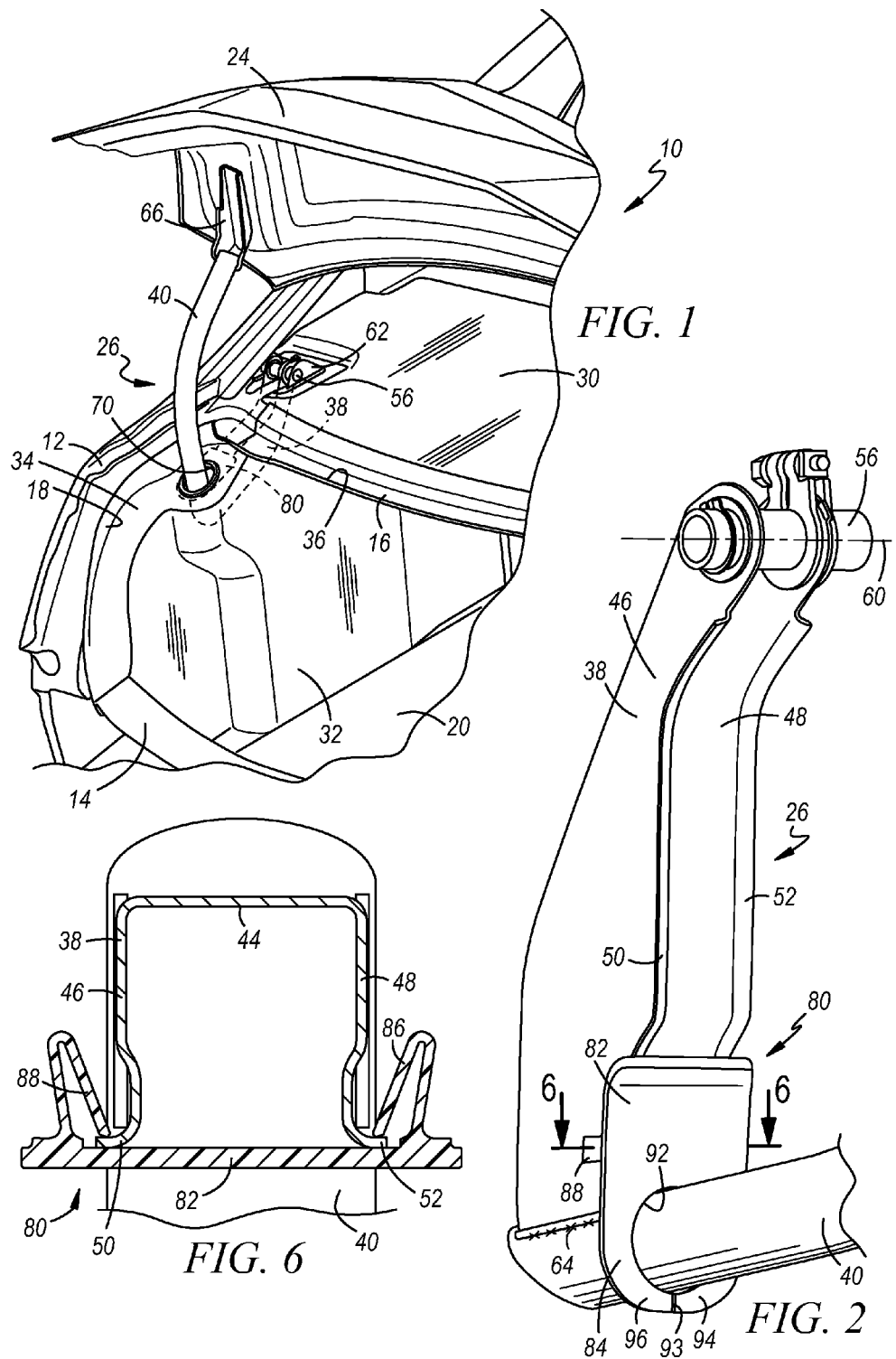

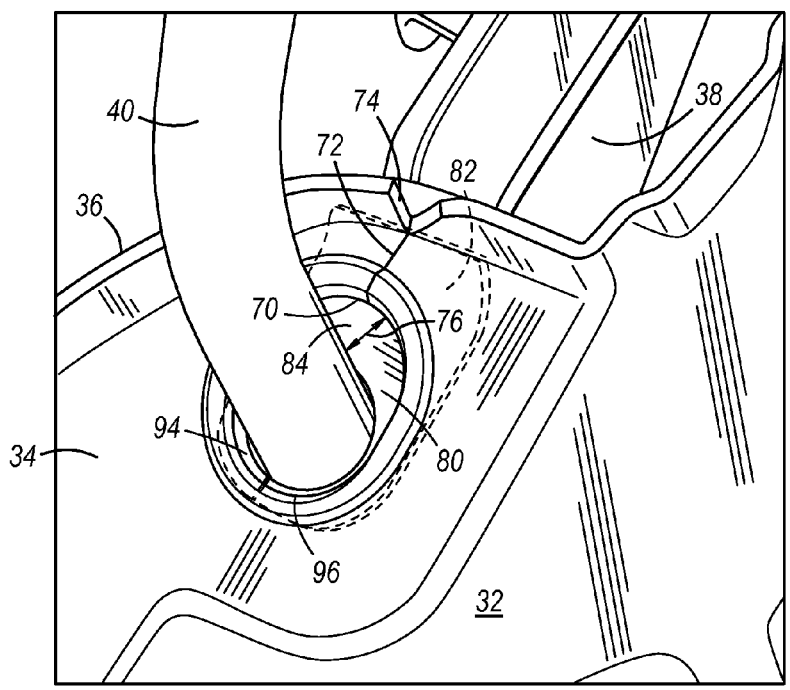
FIG. 3
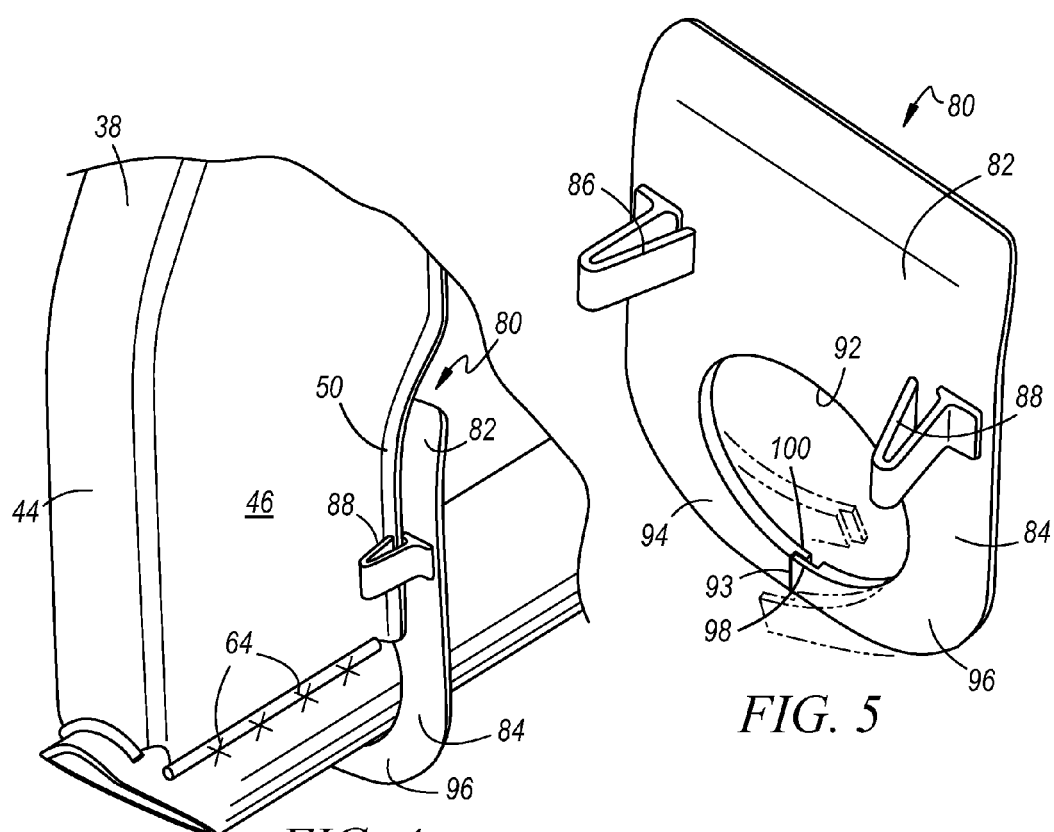
FIG. 4
FIG. 5

US 8,613,478 B2

CLOSEOUT PANEL FOR VEHICLE DECK LID HINGE

FIELD OF THE INVENTION

The present invention relates to a trim panel and hinge assembly arrangement for a vehicle body that avoids interference between the hinge assembly with the trim panel and yet at the same time fully conceals the inner workings of the vehicle body.

BACKGROUND OF THE INVENTION

Motor vehicles have a luggage compartment at the rear of the vehicle which is accessible through a luggage compartment opening. A deck lid panel is mounted on a hinge assembly. The hinge assembly enables movement of the deck lid panel between an open position providing access to the luggage compartment and a closed position that seals the luggage compartment opening to protect and secure the luggage or other items stored in the luggage compartment.

It is well known to provide a trim panel that mounts on the sidewall of the luggage compartment. The trim panel prevents the luggage from being placed in a position that would interfere with the operation of the hinge assembly. In addition, the hinge assembly is not particularly attractive and the trim panel improves the aesthetics of the luggage compartment by limiting the vehicle user's ability to see the deck lid hinge and other unattractive inner workings of the vehicle body. Concealment of the hinge assembly from view would require that the trim panel fit very tightly about the hinge assembly so that the vehicle user will not have a line of sight into the area behind the trim panel. However, the trim panel cannot fit tightly about the hinge assembly because it is necessary to avoid the possibility of interference between the trim panel and the hinge assembly. Interference between the trim panel and hinge assembly can result because of normal dimensional variations during the manufacture of the motor vehicle. In addition the hinge assembly must have a range of adjustment so that the deck lid can be precisely fitted within the luggage compartment opening. Furthermore, some users may force oversize luggage items into the luggage compartment which will bend or dislodge the trim panel, causing the trim panel to interfere with the operation of the hinge assembly. Accordingly, it is customary to have the trim panel surround the hinge assembly as close as possible and yet leave a substantial remaining gap between the trim panel and hinge assembly to provide an allowance for manufacturing variation, or adjustment of the hinge assembly, or dislodgement of the trim panel.

It would be desirable to provide a new and improved trim panel and hinge assembly arrangement for a vehicle body that would avoid the undesirable interference of the hinge assembly with the trim panel and yet at the same time fully conceal the unsightly inner workings of the vehicle from the vehicle user's sight.

SUMMARY OF THE INVENTION

A vehicle has a deck lid for closing a vehicle luggage compartment. The deck lid is mounted on a hinge assembly that includes a hinge lever pivoted on a vehicle body and a hinge arm attached to the deck lid. A trim panel lines the luggage compartment and has an oversize aperture creating a gap through which the hinge arm travels freely without interference with the trim panel during the opening and closing movement of the deck lid. A closeout panel is mounted on the hinge assembly to travel therewith. The closeout panel is sized larger than the size of the oversize aperture and upon the deck lid reaching the open position, the closeout panel will have moved with the hinge assembly to a position closely adjacent the trim panel so that the closeout panel closes the gap and prevents an observer from seeing through the gap.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings.

FIG. 1 is a perspective view of a motor vehicle body showing the rear deck lid in an open position allowing access to the luggage compartment.

FIG. 2 is a perspective view of the hinge assembly, including a hinge lever, a hinge arm, and a closeout panel.

FIG. 3 is an enlarged fragment of FIG. 1.

FIG. 4 is an enlarged perspective view showing the closeout panel mounted on the hinge assembly.

FIG. 5 is a perspective view of the closeout panel.

FIG. 6 is a section view taken in the direction of arrows 6-6 of FIG. 2.

DETAILED DESCRIPTION OF THE EXEMPLARY EMBODIMENTS

The following description of certain exemplary embodiments is merely exemplary in nature and is not intended to limit the invention, its application, or uses.

In FIG. 1, a vehicle body, generally indicated at 10, includes a left rear quarter panel 12, a sill member 14, and a cross member 16 that cooperate to define an opening 18 through which a luggage compartment 20 is accessible. A rear deck lid 24 is mounted on a hinge assembly, generally indicated at 26. The hinge assembly 26 supports the deck lid 24 for movement between its open position shown in FIG. 1 and a closed position in which the deck lid 24 will tightly seal the opening 18.

The inside of the luggage compartment 20 is lined with a trim panel 32 that improves the aesthetics of the luggage compartment interior and also prevents luggage from interfering with the operation of the hinge assembly 26. The trim panel 32 has a front side 34 that faces into the luggage compartment 20, and a backside 36 that faces toward the outside of the vehicle body. The trim panel 32 is molded carpet or fiber material, molded plastic, or other material that is molded and shaped to the shape of the luggage compartment 20. FIG. 1 also shows a closure panel 30 that extends across the vehicle body 10 between the rear seat, not shown, and the cross member 16.

The hinge assembly 26 is shown in FIGS. 1, 2 and 6. The hinge assembly 26 includes a hinge lever 38 and a hinge arm 40. The hinge lever 38 is of stamped steel construction and has a U-shaped cross-section, best shown in FIG. 6. The U-shaped cross-section is defined by a back wall 44 and opposed sidewalls 46 and 48. The sidewall 46 terminates at an outwardly bent flange 50. The sidewall 48 terminates at an outwardly bent flange 52. The upper end of the hinge lever 38 has a pivot shaft 56 pivoted on a vehicle body bracket 62, as shown in FIG. 1, to establish a pivot axis 60 about which the hinge lever 38 will pivot. A suitable spring mechanism, not shown, acts upon the hinge lever 38 to bias the deck lid 24 toward its open position of FIG. 1 and hold the deck lid 24 at the open position.

The hinge arm 40 of the hinge assembly 26 is a curved length of round metal tubing, as shown in FIGS. 1 and 2. One end of the hinge arm 40 is welded to the lower end of the hinge lever 38 by welds 64. The other end of the hinge arm 40 has a mounting bracket 66 welded thereto. As seen in FIG. 1, the mounting bracket 66 is bolted or welded to the deck lid 24. The hinge arm 40 has a curved shape, preferably a circular arcuate shape. Upon pivoting of the hinge lever 38 about pivot axis 60, the hinge arm 40 will travel at a constant radial distance about the pivot axis 60.

As seen in FIGS. 1 and 3, the trim panel 32 has an aperture 70 that receives the hinge arm 40. As best seen in FIG. 3, the trim panel 32 has a slit 72 and a notch 74 by which the trim panel 32 can be flexed during its installation in order to be fitted around the hinge arm 40. FIG. 1 shows that the hinge lever 38 is mostly hidden behind the trim panel 32. However, because of manufacturing and assembly variations, it is necessary that the diameter of the aperture 70 be substantially greater than the diameter of the round tube of hinge arm 40. This oversizing of the aperture 70 in relation to the diameter of the hinge arm 40 creates a gap 76 between the trim panel 32 and the hinge arm 40, and thereby avoids the possibility of interference between the hinge assembly 26 and the trim panel 32. However, the disadvantage of oversizing the aperture 70 is that the vehicle user will have a line of sight through the gap 76 into the unattractive inside workings of the vehicle body, including a view of the hinge lever 38.

FIGS. 2-6 show a closeout panel, generally indicated at 80, for closing out the oversized aperture 70 so that the occupant user will not have a line of sight through the gap 76 into the unattractive inside workings of the vehicle. The closeout panel 80 is preferably of molded plastic and includes an upper mounting portion 82 that mounts the closeout panel 80 on the hinge lever 38, and a lower closeout portion 84 that tightly surrounds the hinge arm 40.

The mounting portion 82 of the closeout panel 80 lies flat against the flanges 50 and 52 of the lever arm 38. A pair of integrally molded fasteners, such as snap tabs 86 and 88, are provided on the mounting portion 82 and snap onto the flanges 50 and 52 of the opposed sidewalls 46 and 48 of hinge lever 38. Thus, the snap tabs 86 and 88 mount closeout panel 80 on the hinge assembly 26.

As best seen in FIG. 5, the closeout portion 84 of the closeout panel 80 has a circular opening 92 that is sized to fit tightly around the outside surface of the hinge arm 40. The closeout portion 84 has a slit 93 that divides the closeout portion 84 of the closeout panel 80 into left and right flexible arm portions 94 and 96. By flexing the flexible arm portions 94 and 96, as shown in the phantom lines of FIG. 5, the closeout portion 84 of the closeout panel 80 fits over the hinge arm 40. The flexible arms portions 94 and 96 are self-biased to the solid line position of FIG. 5. The ends of the flexible arm portions 94 and 96 have overlapping tabs 98 and 100.

FIGS. 2 and 4 show the fully installed position of the closeout panel 80. The closeout panel 80 will travel with the hinge assembly 26, toward and away from the backside 36 of the trim panel 32 during movement of the deck lid 24 between the open and closed positions.

As seen in FIGS. 1 and 3, when the deck lid 24 reaches the fully open position, the deck lid hinge assembly 26 has traveled rearwardly. The hinge lever 38 has swung rearwardly so that it closely approaches the backside of the trim panel 32. The hinge arm 40 has swung rearwardly and upwardly so that the full length of the hinge arm is projecting through the aperture 70 of the trim panel 32. The closeout panel 80 has traveled rearwardly and upwardly with the hinge assembly 26 and come into close-fitting or actual engaging contact with the backside 36 of the trim panel 32. The vehicle user can no longer see through the gap 76 between the hinge arm 40 and the aperture 70 of the trim panel 32.

Thus the invention provides a new and improved trim panel and hinge assembly arrangement for a vehicle body that avoids the undesirable interference of the hinge assembly with the luggage compartment trim panel, and yet, at the same time, fully conceal conceals the unattractive inner workings of the vehicle body from the vehicle user's view. In particular, the hinge assembly 26 includes a hinge lever 38 that remains behind the trim panel 32, and a hinge arm 40 that travels in and out of the aperture 70 of the trim panel during the movement of the deck lid between the open and closed positions. The closeout panel 80 is mounted on the hinge lever 38, and travels with the hinge arm 40, but remains behind the trim panel 32 at all times. When the travel of the hinge arm 40 reaches the full open position, the closeout panel will have traveled into very close proximity or, preferably, contact with the backside 36 of the trim panel 32 to fully close the gap 76 through which a vehicle user could have a line of sight into the unattractive inner workings of the hinge assembly and vehicle body.

It will be understood that the particular hinge design shown in the appended drawing is just one example of a hood hinge in which the invention can be employed. Whatever the hinge design, the closeout panel will be mounted on a part of the hinge assembly that remains behind the oversized aperture in the trim panel, and will travel with the hinge assembly so that the closeout panel will either contact or closely approach the backside of the trim panel when the deck lid is fully open. The closeout panel is conveniently injection molded plastic, but can be metal, rubber or other construction. In addition, the closeout panel can be mounted on the hinge lever by the integral clips shown herein, or, alternatively, by adhesive, mechanical fasteners or other methods of attachment.

What is claimed is:

1. A deck lid for closing a vehicle luggage compartment in a vehicle body;

a hinge assembly mounted on a vehicle body and having a hinge lever pivotally attached to the vehicle body and a hinge arm attached to the deck lid, said hinge lever being a stamped steel member having opposed sidewalls and the hinge arm being a round tube welded to the hinge lever;

a trim panel lining the luggage compartment and having a frontside and a backside and an oversize aperture creating a gap through which the hinge arm travels freely in and out of the oversize aperture between the frontside and the backside of the trim panel without interference with the trim panel during the opening and closing movement of the deck lid, while the hinge lever remains behind the backside of the trim panel;

and a closeout panel mounted on the hinge assembly behind the backside of the trim panel, said closeout panel being molded plastic and having a mounting portion with integrally formed fasteners mounting the closeout panel on the hinge lever and a closeout portion that encircles the hinge arm, said closeout portion having a slit defining flexible closeout arms that spread apart to enable the closeout portion to be installed in encirclement of the round tube by spreading apart the closeout arms, said closeout portion sized larger than the size of the oversize aperture, and upon the deck lid reaching the open position, the closeout panel having moved with the hinge assembly to a position closely adjacent the backside of the trim panel so that the closeout panel closes the gap and prevents an observer from seeing through the gap.

2. The combination of claim 1 further comprising the sidewalls terminating in flanges and the integrally formed fasteners engaging with the flanges to mount the closeout panel on the hinge assembly.

3. The combination of claim 1 further comprising the closeout portion having flexible closeout arms that are installed to encircle the hinge arm by spreading apart the closeout arms.

4. The combination of claim 3 further comprising the flexible closeout arms being self-biasing to so that after being spread apart the flexible closeout arms return to a normal position encircling the hinge arm.

* * * * *